United States Patent [19]
Beam et al.

[11] 3,966,221
[45] June 29, 1976

[54] YARN SHIPPING RACK ASSEMBLY

[75] Inventors: John A. Beam, Greenville; John D. Bane, Spartanburg, both of S.C.

[73] Assignee: Hoechst Fibers Incorporated, Spartanburg, S.C.

[22] Filed: Nov. 15, 1974

[21] Appl. No.: 524,050

[52] U.S. Cl. ............................. 280/79.3; 242/131
[51] Int. Cl.² .......................................... B62B 3/02
[58] Field of Search ............... 211/59, 177, 23, 24; 242/130.3, 131; 206/511, 512; 280/79.2, 79.3

[56] References Cited
UNITED STATES PATENTS

| | | | |
|---|---|---|---|
| 2,100,935 | 11/1937 | Black .............................. | 211/59 X |
| 3,297,276 | 1/1967 | Skufca ............................ | 211/59 X |
| 3,318,473 | 5/1967 | Jones et al. .................... | 206/511 X |
| 3,347,412 | 10/1967 | McKinney ........................ | 206/511 |
| 3,388,806 | 6/1968 | Cunningham, Jr. et al. ..... | 211/59 X |
| 3,409,141 | 11/1968 | Cunningham, Jr. et al. ... | 242/131 X |
| 3,866,787 | 2/1975 | Allegri et al. ................... | 206/511 X |

FOREIGN PATENTS OR APPLICATIONS

| | | | |
|---|---|---|---|
| 536,897 | 4/1955 | Belgium ............................ | 242/131 |

*Primary Examiner*—M. H. Wood, Jr.
*Assistant Examiner*—Michael J. Forman
*Attorney, Agent, or Firm*—Wellington M. Manning, Jr.

[57] ABSTRACT

An improved yarn shipping rack that is modular in concept and includes an outer, skeletal frame having vertical and horizontal members united to form same is disclosed herein. Inner horizontal members in vertical alignment are secured to outer vertical members, and have yarn package receiving elements provided thereon that extend angularly outwardly therefrom. The yarn package receiving elements are preferably provided on both sides and are staggered or offset on each side with respect to each adjacent element to permit a greater number of yarn packages to be received in a given unit of space. Stacking means for the individual modules are provided at the upper and/or lower ends of same to receive the next adjacent module and hold same against appreciable lateral movement. A group of modules may thus be safely stacked during storage and/or transit. Channels or other means are provided on the lower end of each module to receive a lifting element such as a fork-lift or the like. Further, a wheeled dolly is provided to receive one or more modules and afford mobility thereto.

15 Claims, 7 Drawing Figures

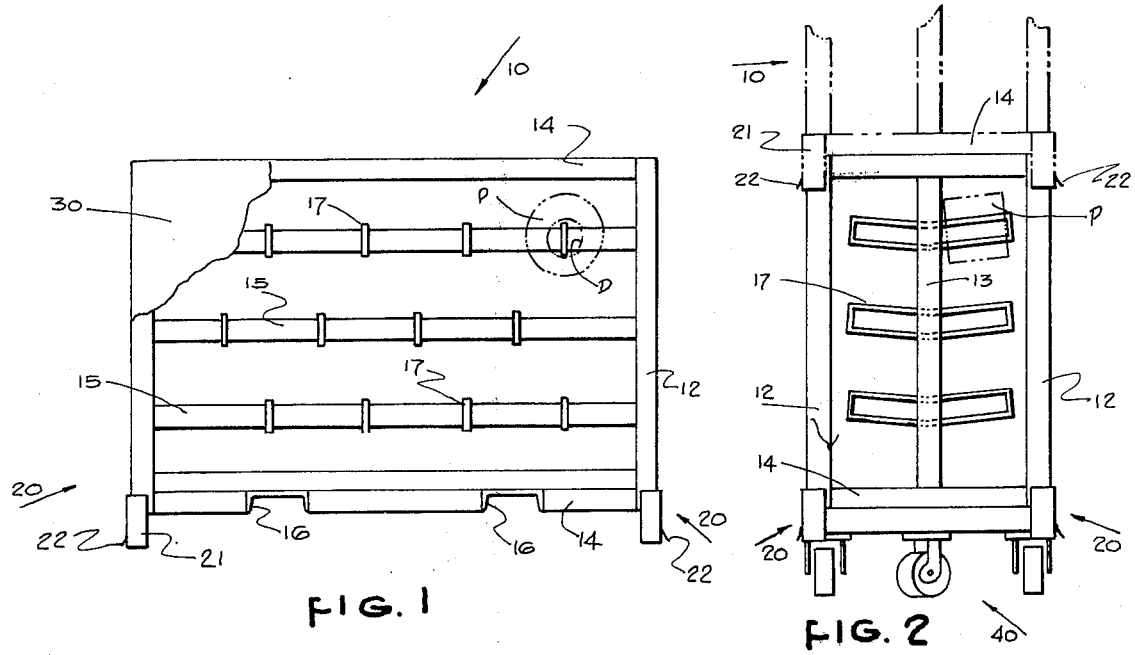
FIG. 1
FIG. 2
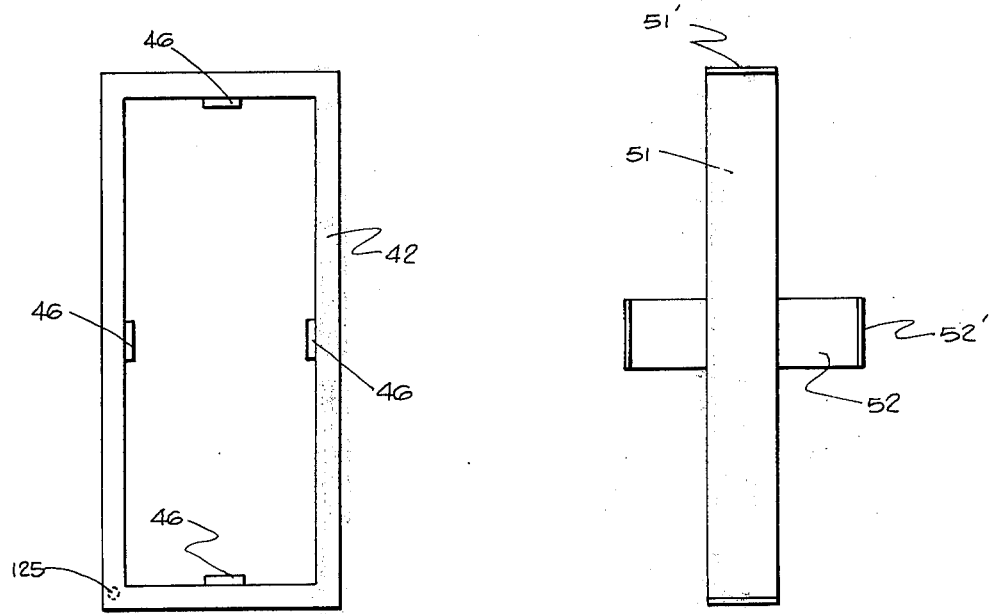
FIG. 3
FIG. 4
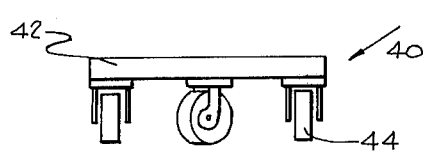
FIG. 5

YARN SHIPPING RACK ASSEMBLY

BACKGROUND OF THE INVENTION

Numerous designs for yarn shipping or transport racks have been provided where a skeletal structure is provided with a plurality of package receiving pins protruding therefrom. Normally speaking, the trunk, transport, dolly or the like is provided with wheels secured at a lower end thereof, and may or may not be provided with a super structure above the package receiving area to suspend the racks from a conveyor for transportation throughout the plant in which the rack is being employed.

In general, a majority of yarn racks as mentioned above are designed for use within the plant only. Consequently, yarn shipped from one plant to another previously was removed from the storage racks, packaged for shipment in corrugated paper containers or the like, shipped to its destination and replaced onto racks, creels, or the like. Such schemes for transportation of yarn packages are fraught with problems. For example, additional handling of the packages leads to a greater probability of damage to the yarn. Likewise, the yarn can be damaged due to lack of strength of the containers, water damage to the container or the like. Still further, corrugated shipping containers are generally an expendible item of commerce such that overall costs are greater as compared to the yarn transportation system of the present invention.

The present invention provides an improved procedure for transportation of yarn packages that avoids or at least minimizes the prior art problems alluded to above. Likewise, an improved rack system per se is also an integral part of the present invention.

Known prior art is devoid of any teaching or suggestion of the subject matter of the present invention. Exemplary of the known prior art are U.S. Pat. No. 2,015,548 to Carter; U.S. Pat. No. 2,127,999 to Johnson; U.S. Pat. No. 2,475,724 to Shipman; U.S. Pat. No. 2,555,529 to Batts; U.S. Pat. No. 3,297,276 to Skufca; U.S. Pat. No. 3,388,806 to Cunningham, Jr. et al.; U.S. Pat. No. 3,409,141 to Cunningham, Jr. et. al.; U.S. Pat. No. 3,586,178 to Zurheide et al., and U.S. Pat. No. 3,674,223 to Phillip.

SUMMARY OF THE INVENTION

It is an object of the present invention to provide an improved yarn shipping system.

Another object of the present invention is to provide an improved yarn shipping rack assembly wherein a plurality of modules are stacked, with the module stack being received by a wheeled dolly.

Yet another object of the present invention is to provide a yarn shipping module.

Still another object of the present invention is to provide an improved method for shipping yarn from one locale to another and storing same for ultimate consumption.

Generally speaking, the improved yarn shipping rack assembly of the present invention includes at least one module which comprises an outer skeletal frame, said outer frame being generally rectangular in cross section and being made up of a plurality of vertical end struts and a plurality of horizontal struts secured thereto; a plurality of horizontal members secured to said outer frame and extending across said rack, and constituting an inner frame, said horizontal members being generally in spaced apart vertical alignment along a central axis through said rack; a plurality of package receiving means secured along said horizontal members of said inner frame; stacking means provided at one of said top and said bottom of said module that cooperate with an opposite end of an adjacent module to afford stability to a stack of said modules; and means provided along a bottom side of said module to receive lifting elements.

More specifically, yarn packages which may be considerable in size from the standpoint of dimensions, and weigh in the neighborhood of 5 to 40 pounds, or more, are produced and are receivable on package holding elements that are themselves preferably skeletal structures extending outwardly at an angle above horizontal. The size of the skeletal package receiving element approximates the inside diameter of the core of the yarn package to secure or hold the package in place with minimal package movement. Alternatively, a tubular element may be employed in lieu of the skeletal structure element. In any event, yarn packages may be placed on the package receiving elements of the module and while in place, may be transported to an ultimate destination. Upon reaching the destination, the yarn may be unwound from the packages without removal of the packages from the module or may be removed for further processing. The improved yarn transport system of the present invention is thus capable of transporting and storing the yarn until it becomes desirable to remove the yarn from the package for consumption or further processing. Even then, as mentioned above, the module may serve as a creel or the package may be removed therefrom.

Structurally, the modules of the assembly of the present invention are preferably provided with stacking means that comprise channel-type members at each corner of either the top or bottom thereof which act in similar fashion as a sleeve and thus guide and receive the opposite end of a next adjacent module in stacking arrangement therewith and hold same against any substantial lateral movement with respect thereto. Several modules may thus be stacked vertically without excessive danger of collapse of the stack due to improper contact between the modules. Channels are also preferably provided beneath the bottom rails of each module in such particular location as to permit the module to be engaged by a fork-lift or other suitable device in a balanced manner and lifted thereby without excessive danger of topple of the module from the lifting element. The channel lifting structures permit the ingress and egress of the lifting elements during stacking, after stacking and for placement on and removal from a wheeled dolly.

The wheeled dolly per se is preferably a structural framework having means thereon to receive one or more stacked modules and hold same against lateral movement with respect thereto. Casters or wheels are secured to the underside of the dolly framework, preferably in a diamond arrangement. In other words, one caster is located to reside adjacent a point intermediate the length of each leg of the module rectangle. In a certain embodiment, a rectangular framework is provided for the dolly with one wheel or caster being located intermediate the length of each leg of the rectangle. In another embodiment, a cross structure arrangement is provided for the dolly framework with a caster being located at each end of the legs of the cross.

In conventional packaging of yarn, it is often desirable to cover each individual package with a paper sleeve or the like which, of course, adds to the expense of yarn handling due to costs of the cover per se and labor for placement and removal of the individual covers. A prominant feature of the modules of the present invention is to provide a general cover for the module and not the individual package. Such a module cover is reuseable and may be an integral unit or may be provided for the individual sides of the module. Preferably, the cover is a plurality of individual plastic sheets to cover the top and all sides of the module.

BRIEF DESCRIPTION OF THE DRAWINGS

FIG. 1 is a side elevational view of an improved shipping rack module according to the teachings of the present invention.

FIG. 2 is an end elevational view of the rack as shown in FIG. 1.

FIG. 3 is a plan view of a wheeled dolly suitable for use according to the teachings of the present invention.

FIG. 4 is a further embodiment of a wheeled dolly according to the teachings of the present invention.

FIG. 5 is a side view of a wheeled dolly as shown in FIG. 3.

DESCRIPTION OF THE PREFERRED EMBODIMENTS

Figure 6:
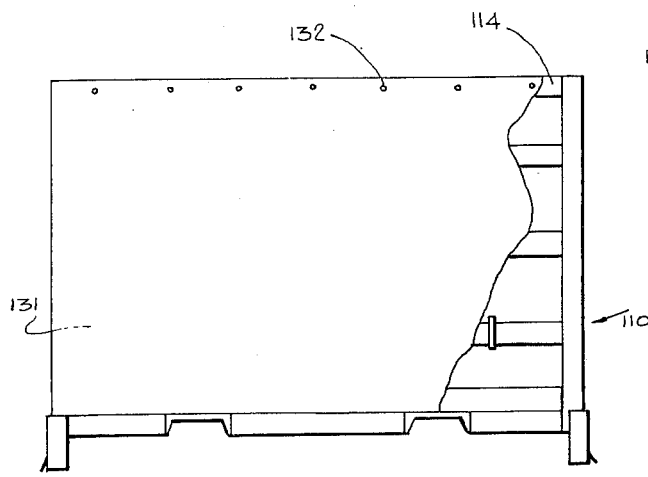
FIG. 6 is a side elevational view of a module according to the present invention illustrating a further feature thereof.

Referring now to the Figures, preferred embodiments of the present invention will be described in detail. The improved yarn storage rack assembly according to the teachings of the present invention follows a modular concept wherein a plurality of rack modules, generally indicated as 10 are provided for use and form the assembly. Rack modules 10 are constructed from a plurality of vertical and horizontal structural members 12 and 14 respectively, that are united to form an outer skeletal frame. A further end vertical member 13 is secured between vertical members 12 on both ends of rack module 10. Intermediate vertical end members 13 have a plurality of horizontal supports 15 secured thereto at opposite ends in spaced apart vertical alignment. Three such horizontal rack members 15 are illustrated in FIGS. 1 and 2, though obviously any desired number may be utilized, depending upon the size of module 10.

Secured to opposite sides of horizontal supports 15 are a plurality of package receiver elements 17 each of which may receive a package P of yarn as depicted in phantom in FIGS. 1 and 2. Note, in FIG. 1 that receiver elements 17 are offset or staggered with respect to each vertically adjacent receiver element 17 to facilitate receipt of an increased number of packages P in a given unit of height. Note also that the inner diameter D of the yarn package core is approximately the same as the width of the receiver elements 17. Packages P are thus securely maintained on elements 17 during storage and transit of the yarn, to minimize damage to the yarn during transit and/or storage.

The improved yarn shipping rack of the present invention as discussed above is designed according to a modular concept. This modular concept permits a yarn package P to be placed on the module receiver elements 17 by the yarn producer and remain thereon, untouched, until transported to the next consumer or until removal is desired. At its destination, the yarn may then be fed directly from the module 10 or the packages may be removed as desired. Possible damage to the yarn is thereby substantially lessened. Likewise, since no intermediate handling labor is involved except for the handling of the module per se, overall costs are reduced. Bottom horizontal structural members 14 of each module 10 are provided with a plurality of channels 16 therein. Channels 16 are positioned at predetermined locations along horizontal members 14 to permit fork-lift tines or other lifting elements to pass therein for lifting of the module. Particular placement of channels 16 is designed to provide proper balance to the module and lessen any possibility of the module overturning when residing on the lifting elements.

FIGS. 1 and 2 further illustrate channel stacking means 20 provided at a lower end of module 10 at each corner. Stacking means 20 are preferably produced by a pair of plates 21 secured to vertical frame members 12 and extending axially beyond the extremity of module 10. An outer end 22 of each plate 21 (lower as illustrated) is flared outwardly. Stacking means 20 thus affords an arrangement for partially surrounding the outer skeletal frame of a next adjacent module 10 as is illustrated in FIG. 2 where a portion of an adjacent module 10 is illustrated in phantom in a proper stacking coupling with the lower module 10 as shown in solid lines. Flared edges 22 of plates 21 guide the modules 10 into proper stacking alignment whereby stacking members 20 afford stability to the assembly. With on module 10 stacked atop another, channels 16 remain available for receipt of the lifting elements. Stacking or removal of modules 10 is thus further facilitated. Stacking elements 20 of module 10 can further receive therewithin, below the lower module, a wheeled dolly generally indicated as 40.

Figure 7:
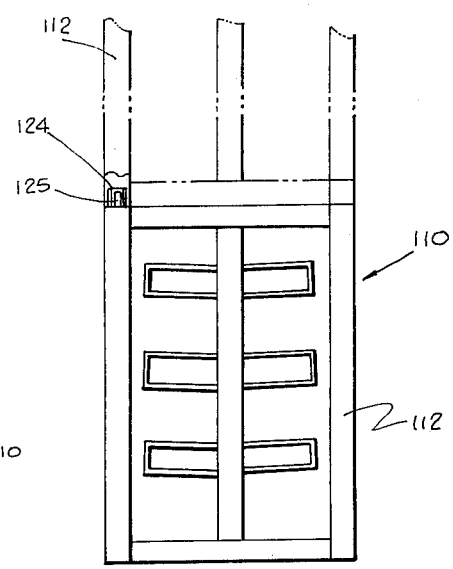
FIG. 7 is an end elevational view of a module according to the present invention illustrating a further embodiment of a stacking means.

Stacking means 20 is preferably of a construction as shown in FIGS. 1 and 2. A further definition of a suitable stacking means is illustrated in FIG. 7. A lower end of frame members 112 has a female receiver 124 received therein as illustrated in the cut away. Complementary male connectors 125 are provided atop members 112 and are mateable with female receivers 124 on the lower end of the next adjacent module 110. Conversely, male member 125 may extend downwardly from the lower end of frame member 112, whereby modules 110 would be held off the floor or other surfaces thereby. In such arrangement, wheeled dollies having rectangular frames 42 could likewise have a female coupling 124 at each corner (shown in phantom in FIG. 4) to properly receive the module 10.

Module dolly 40, in a preferred embodiment, comprises a frame 42 as shown in FIGS. 3 and 5 with a plurality of casters or wheels 44 positioned thereunder and appropriately secured for rotary movement to flanges 46. A module 10 may thus be placed over a dolly 40 as illustrated in FIG. 2, with stacking elements 20 passing around the outer periphery of frame 42 thereof. The module 10 is thereby secured against sliding off dolly 40. A single module 10 or any practical number of modules 10 stacked atop the lower module 10 from an assembly with dolly 40 and may be transported as an assembly. In this fashion, a module assembly may be rolled to a desired location within a single plant, into a boxcar, a trailer or the like. When in place, the stack of modules 10 may be removed from dolly 40 during further storage or transport, or may remain on dolly 40 during interplant transit.

A modification to the dolly 40 is shown in FIG. 4 wherein a crossing framework is provided by elements 51 and 52 which are secured to each other at the intersection. A caster (not shown) is secured at each end of the elements 51 and 52 thus providing a diamond shaped caster formation. The diamond shaped caster formation is likewise seen for dolly 40 with a rectangular frame 42 in FIGS. 3 and 5. The modified dolly as shown in FIG. 4 is also provided with upturned flanges 51' and 52' at the outer ends of cross members 51 and 52 respectively. Flanges 51' and 52' pass around the edges of the lower outer frame elements 14 of modules 10, and thus secure dolly 40 to the module framework.

In addition to the structural features of the improved shipping rack concept according to the present invention, as mentioned above, numerous additional features may be included. For example, instead of wrapping individual packages of yarn for shipment, the present invention, according to a preferred embodiment, utilizes a cover element 30 which surrounds the entire module except for the underside thereof (See FIG. 1). In this fashion, individual modules are enclosed with a separate cover, preferably a plastic sheet material. As illustrated in FIG. 6, cover 130 may further comprise individual sheets 131 secured to horizontal members 114 by suitable means 132 for coverage of only one side of module 110. Individual side covers 131 may thus be raised along one side of module 10 while leaving the other sides covered. As such, even after reaching the destination of the yarn, the cover maintains the yarn in a good state of cleanliness and thus further reduces the possibility of contamination or damage to the yarn during storage and/or transit.

Having described the present invention in detail, it is obvious that one skilled in the art will be able to make variations and modifications thereto without departing from the scope of the invention. Accordingly, the scope of the present invention should be determined only by the claims appended hereto.

What is claimed is:

1. An improved shipping rack module for a plurality of packages of textile yarn comprising:
   a. an outer skeletal frame, said outer frame being generally rectangular in cross section and being made up of a plurality of vertical end struts and a plurality of horizontal struts secured thereto, said frame defining an outer periphery around said shipping rack;
   b. a plurality of horizontal support members secured to said outer frame within said periphery and extending across said rack, said horizontal members constituting an inner frame and being generally in spaced apart vertical alignment along a vertical axis through said rack;
   c. a plurality of yarn package receiving means secured along said horizontal support members of said inner frame;
   d. means provided at one of said top and said bottom of said rack to cooperate with an opposite end of an adjacent rack to stack said racks; and
   e. means provided along a bottom side of said rack to receive lifting elements.

2. An improved yarn shipping rack module as defined in claim 1 wherein said package receiving means comprise members extending outwardly from said horizontal members and angled upwardly with respect to horizontal.

3. An improved yarn shipping rack module as defined in claim 2 wherein said package receiving members comprise a pair of generally parallel struts secured together at opposite ends, the distance between said struts approximating the inside diameter of a yarn package to be received thereover.

4. An improved yarn shipping rack module as defined in claim 3 wherein said package receiving members are staggered such that each member is offset from each adjacent member.

5. An improved yarn shipping rack module as defined in claim 1 wherein said stacking means comprise angle members secured to corner vertical posts of said outer frame and extending beyond the end thereof, said angle members cooperating with the corners of the outer frame of a next adjacent rack in stacking.

6. An improved yarn shipping rack module as defined in claim 1 wherein said stacking means comprise a male connector on one module and a female connector on an opposite end of said module whereby said male connector of one module is receivable by a complementary female connector on a next adjacent module to facilitate stacking.

7. An improved yarn shipping rack module as defined in claim 1 wherein said lifting element receiving means comprises two channels received on the bottom of said module, said channels being open on the underside and at both ends thereof.

8. An improved yarn shipping rack module as defined in claim 1 further comprising cover means for said module.

9. An improved yarn shipping rack module as defined in claim 8 wherein said cover means is a single unit that may be slipped over the top of said module.

10. An improved yarn shipping rack module as defined in claim 8 wherein said cover means comprises a plurality of sheets, each sheet being secured to said outer frame of said module along only one side thereof.

11. An improved yarn shipping rack assembly comprising:
   a. at least one rack module, said module having an outer skeletal framework made up of vertical and horizontal members secured together and defining an outer periphery around said module; a plurality of inner horizontal members in spaced apart vertical relationship and secured to said outer frame within said periphery, said inner horizontal members having yarn package receiving means provided thereon in staggered fashion;
   b. means provided on said frame to cooperate with a frame of a next adjacent rack module to permit stacking of said rack modules; and
   c. a separate wheeled dolley received below said at least one rack module, said dolley having members thereon to preclude lateral movement of said rack module with respect to said dolley.

12. An improved yarn shipping rack as defined in claim 11 wherein said package receiving means comprises a pair of generally parallel, vertically aligned struts secured to said horizontal members at an upward angle.

13. An improved yarn shipping rack assembly as defined in claim 11 wherein said stacking means are angle members secured to the bottom of vertical outer frame members of said rack module, said angle members being flared outwardly on a lower end thereof to assist in guiding an upper end of a vertical member of an adjacent rack module thereinto.

14. An improved yarn shipping rack assembly as defined in claim 11 wherein said stacking means comprise male connectors on one end of each rack module and female connectors on the other end of each rack module.

15. An improved yarn shipping rack assembly as defined in claim 11 wherein said dolly is provided with casters in a diamond arrangement.

* * * * *